United States Patent Office 3,269,690
Patented August 30, 1966

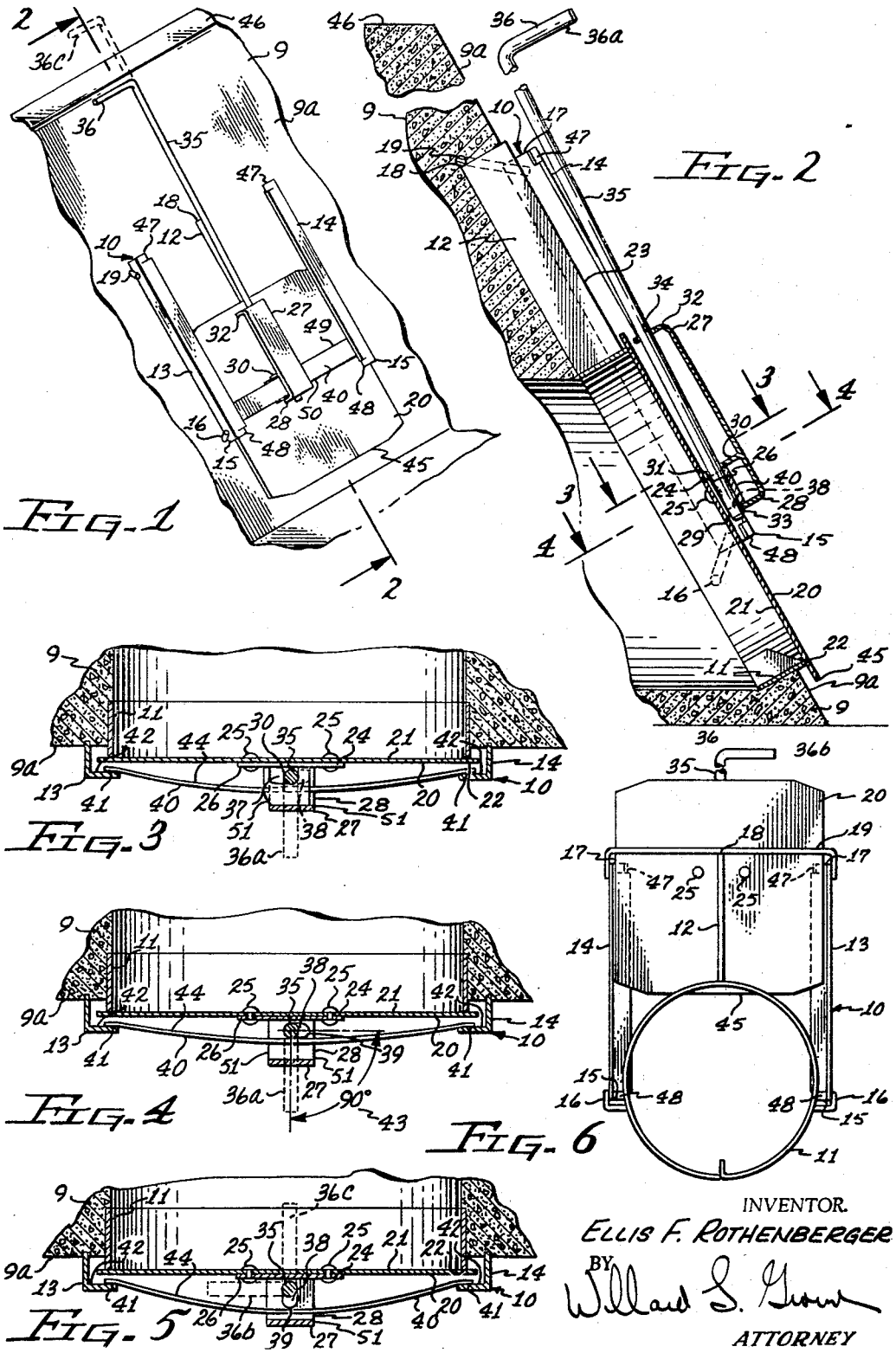

3,269,690
IRRIGATION DITCH GATE VALVE
Ellis F. Rothenberger, P.O. Box 2002,
Fullerton, Calif.
Filed Mar. 2, 1964, Ser. No. 348,565
1 Claim. (Cl. 251—147)

This invention pertains to certain new and useful improvements in an irrigation valve which is particularly well adapted to efficient and reliable use when employed in an irrigation ditch, at the end of a conduit, pipe or the like.

This invention is directed to improvements in irrigation ditch gate valves such as shown in my Patent 2,835,469 issued May 20, 1958.

One of the objects of this invention is to provide an irrigation ditch gate valve of improved construction to facilitate installation and provide more efficient operation and servicing of the valve under all operating conditions.

Another object of this invention is to provide an irrigation ditch gate valve having a gate and operating handle structure that can be readily assembled and disassembled without fastenings and tools relative to the valve seat apparatus fixed in the irrigation ditch lining.

Still another object is to provide an irrigation ditch gate valve, gate disc or plate that cannot be accidently disengaged from the valve seat member unless the gate is in fully retracted open position.

Another object is to provide an irrigation ditch gate valve which has a normal spring-tension friction when moving the gate to various adjusted positions so that the valve will not slip from adjusted positions and a locking arrangement to positively clamp the valve in closed or any adjusted position from a single manipulating handle of the valve.

Further features and advantages of this invention will appear from a detailed description of the drawings in which:

FIG. 1 is a front perspective of an irrigation ditch gate valve incorporating the features of this inventioin.

FIG. 2 is an enlarged fragmentary sectional view on the line 2—2 of FIG. 1.

FIG. 3 is an enlarged fragmentary sectional view on the line 3—3 of FIG. 2.

FIG. 4 is an enlarged fragmentary sectional view on the line 4—4 of FIG. 2.

FIG. 5 is an enlarged fragmentary sectional view similar to FIG. 4 showing the gate in clamped position.

FIG. 6 is a rear elevation of the irrigation ditch gate valve.

As an example of one embodiment of this invention there is shown an irrigation ditch gate valve having a frame 10 appropriately imbedded in the concrete lining 9 comprising a valve seat ring 11 to which is fixed the upwardly extending radially disposed guide leg 12. Laterally spaced L-shaped guide rails 13 and 14 extend up each side of the valve seat ring 11 and rigidly attached at their lower ends 15 by connecting pieces 16 and rigidly connected at their upper ends 17 to the top 18 of the guide leg 12 by transverse rod 19.

The gate 20, which may take the form of a disc or plate is adapted to slide up and down with its rear or down stream surface 21 sliding on the valve seat edge 22 of the ring 11 and the forward edge 23 of them guide leg 12, and is suitably fixed to the plate 24 by suitable rivets or screws 25. Fixed to the front face 26 of the plate 24 is the manipulating handle support member 27 having a turned-in portion 28 rigidly fixed adjacent the lower edge 29 of the plate 24 and having an intermediate piece 30 rigidly fixed adjacent to the upper edge 31 of the plate 24 and at the upper end of the handle support member 27 is a turned-in portion 32. Bearing bores 33 and 34 are formed respectively in the turned-in portions 28 and 32 in which is rotatably supported the manipulating handle rod 35 having the radially disposed integral handle 36. The rod 35 passes through one end of an elongated slot formed in the intermediate piece 30, which slot 37 extends to the left, FIG. 3, adjacent the front face 26 of the plate 24. Fixed to the rod 35 between the turned-in portion 28 and the intermediate piece 30 is the cam piece 38 having the cam surface 39. The flat control spring 40 extends and is laterally guided between the turned-in portion 28 and the intermediate piece 30 and extends over the rod 35 on the opposite side thereof from the front face of the plate 24 and has its outer end surfaces 41 adapted to engage the surfaces 42 of the guide rails 13 and 14. It will be noted, FIG. 4, that the handle 36 extends at right angles to the cam piece 38 as indicated at 43.

In FIGS. 2, 3 and 4, the handle is adjusted to a straight out position 36a extending substantially at right angles to the surface 9a at which time the cam piece is flat against the surface 26 of the plate 24 and the inner surface 44 of the control spring while the end surfaces of the cam pieces are confined between the turned-in portion 28 and the intermediate piece 30 so as to restrain relative axial movement of the rod 35 in the bores 33 and 34 of the handle support member 27. Under these conditions the control spring is slightly cambered to exert light sliding pressure at its ends against the surfaces 42 of the guide rails 13 and 14 so that the gate 20 may be readily moved up and down by grasping the handle 36 to position the gate 20 for any desired amount of opening of the valve seat ring 11. The control spring pressure under these conditions is such that the gate will remain in any desired adjusted position when the handle 36 is released but still can be easily slid up and down while maintaining adequate contact at all times of the down stream surface 21 of the gate 20 with the valve seat edge 22 so that the bottom edge 45 can cut through silt, sticks and trash caught in the ring opening when the gate is pushed down to shut off the valve.

For any up and down adjusted position for the gate 20, the gate may be locked to the frame 10 by moving the handle 36 to position 36b as shown in FIGS. 5 and 6 whereupon the cam surface 39 rides up against the inner surface 44 of the control spring 40 to cause it to exert maximum pressure against the surface 42 of the guide rails 13 and 14 so the gate cannot be moved up and down on the ring seat 22 or edge 23 of the guide leg 12 at which time the handle 36 extends substantially parallel to the ditch lining surface 9a. It is important to note that the guide leg absorbs the forces on the gate under these conditions when the gate is locked in the upper portions of its travel so as to prevent springing of the gate.

When it is desired to remove the gate 20 from the frame 10, the gate is moved to fully open position at the top of its travel so that the handle 36 is above the top edge 46 of the ditch lining 9 so that the handle 36 can be rotated to position 36c, FIGS. 1 and 5. This causes the cam piece to again release locking pressure on the springs 40 and at the same time position the cam piece directly below and in alignment with the slot 37 formed in the intermediate piece 30. Under these conditions the handle 36 and rod 35 can be pulled upwardly out of the space between the turned-in piece 28 and the intermediate piece 30, releasing all pressure on the surface 44 of the spring 40 so that the spring may be passed by the upper stop surfaces 47 on the guide rails 13 and 14 to allow the gate to be pulled from the frame 10. Stops 47 normally engage the upper edge 49 at the ends of the spring 40 to limit the upper limit of travel of the gate while stop surfaces 48 on the lower ends of the rails 13 and 14 engage the bottom edge 50 of the spring 40 to limit the lower or closed position of travel of the gate 20. The bore 34 in the handle support member is arranged of such size that the rod 35 and its handle 36 may be pulled down through it with the lower portion of the rod 35 and cam piece 36 extending past the side edges 51 of the turned-in piece 28 and intermediate piece 30.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claim are intended to be included herein.

Having thus fully set forth and described this invention what is claimed and desired to be obtained by United States Letters Patent is:

An irrigation ditch gate valve comprising in combination:
 (a) a frame adapted to be secured in the lining of an irrigation ditch including,
 (b) a valve seat ring having a valve seat,
 (c) parallel spaced guide rails to receive said valve gate joined rigidly to diametrically opposite sides of said ring,
 (d) and a guide leg fixed to and extending radially upwardly from said ring having a forward edge lying in the plane of said valve seat,
 (e) a valve gate having a down stream surface slidingly engaging said valve ring seat and forward edge of said guide leg,
 (f) a manipulating rod rotatably journaled on said valve gate including a radially disposed handle fixed at its upper end,
 (g) a control spring normally tensioned to apply pressure to said valve gate to maintain it in operative contact with said valve seat while allowing adjustment of the amount of opening of said valve ring,
 (h) means on said valve gate adapted to support said control spring midway its ends so that its free outer ends lightly yieldingly slidingly engage said guide rails,
 (i) and means on said valve gate actuable by said single handle control device to increase the tension in said control spring to lock said valve gate in any desired position against relative movement on said frame,
 (j) said last mentioned means including a cam piece on said manipulating rod adapted to be moved by rotation of said manipulating rod by said handle to one position to release said spring to normal sliding tension, to a second position to increase tension to lock said valve against adjustment, and a third position of spring tension release whereby said handle and rod may be withdrawn from said valve gate to permit disassembly of said gate from said frame to facilitate installation, maintenance and servicing of the valve.

References Cited by the Examiner

UNITED STATES PATENTS

| | | | |
|---|---|---|---|
| 496,239 | 4/1893 | Watson | 251—204 |
| 709,102 | 9/1902 | Martin et al. | 251—204 |
| 2,835,469 | 5/1958 | Rothenberger | 251—147 |
| 3,061,266 | 10/1962 | Hoffknecht | 251—147 |

M. CARY NELSON, *Primary Examiner.*

W. CLINE, *Examiner.*